United States Patent
Trivi et al.

(10) Patent No.: US 9,280,537 B2
(45) Date of Patent: Mar. 8, 2016

(54) TECHNIQUES FOR AUTOMATICALLY SELECTING A NATURAL LANGUAGE FOR CONFIGURING AN INPUT METHOD EDITOR AT A COMPUTING DEVICE

(71) Applicant: Google Inc., Mountain View, CA (US)

(72) Inventors: Jean-Michel Roland Trivi, Boulder Creek, CA (US); Bjorn Erik Bringert, Bath (GB)

(73) Assignee: Google Inc., Mountain View, CA (US)

( * ) Notice: Subject to any disclaimer, the term of this patent is extended or adjusted under 35 U.S.C. 154(b) by 199 days.

(21) Appl. No.: 14/066,819

(22) Filed: Oct. 30, 2013

(65) Prior Publication Data
US 2015/0161105 A1  Jun. 11, 2015

(51) Int. Cl.
*G06F 17/28* (2006.01)

(52) U.S. Cl.
CPC .................................. *G06F 17/28* (2013.01)

(58) Field of Classification Search
USPC ................ 704/1, 3, 4, 8, 9, 10, 260, 235, 243
See application file for complete search history.

(56) References Cited

U.S. PATENT DOCUMENTS

| | | | | |
|---|---|---|---|---|
| 5,796,952 A | * | 8/1998 | Davis | G06F 11/3438 707/E17.12 |
| 7,386,438 B1 | * | 6/2008 | Franz | G06F 17/275 704/240 |
| 7,412,374 B1 | * | 8/2008 | Seiler | G06F 17/275 704/7 |
| 2001/0020225 A1 | * | 9/2001 | Zerber | G06F 17/2863 704/3 |
| 2007/0124202 A1 | * | 5/2007 | Simons | G06Q 30/02 705/346 |
| 2008/0126077 A1 | * | 5/2008 | Thorn | G06F 3/0237 704/8 |
| 2008/0281577 A1 | * | 11/2008 | Suzuki | G06F 17/275 704/2 |
| 2010/0169074 A1 | * | 7/2010 | Hung | G06F 17/243 704/8 |

OTHER PUBLICATIONS

Hammarstrom, H. et al., "A Fine-Grained Model for Language Identification," ACM SIGIR 2007 Workshop—Improving Non English Web Searching (iNews'07), 30th Annual International ACM SIGIR Conference, Jul. 27, 2007, Amsterdam, pp. 14-20.

* cited by examiner

*Primary Examiner* — Edgar Guerra-Erazo
(74) *Attorney, Agent, or Firm* — Remarck Law Group PLC (57) ABSTRACT

A computer-implemented method can include initializing, at a computing device including one or more processors, an input method editor for composing an electronic message. The method can include receiving, at the computing device, an input from a user identifying a recipient for the electronic message. The method can include obtaining, at the computing device, language information corresponding to the recipient, the language information indicating one or more suggested natural languages for composing the electronic message. The method can include selecting, at the computing device, a natural language for composing the electronic message based on the language information to obtain a selected natural language. The method can also include configuring, at the computing device, the input method editor based on the selected natural language.

30 Claims, 3 Drawing Sheets

TECHNIQUES FOR AUTOMATICALLY SELECTING A NATURAL LANGUAGE FOR CONFIGURING AN INPUT METHOD EDITOR AT A COMPUTING DEVICE

FIELD

The present disclosure generally relates to computing devices and, more particularly, to techniques for automatically selecting a natural language for configuring an input method editor at a computing device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A user can utilize a computing device, e.g., a mobile phone, to transmit an electronic message to another user (a "recipient"). Examples of electronic messages include e-mail, text messages, and social network messages. The user may speak more than one natural language, which refers to a natural spoken and/or written language, which is different than constructed and formal languages, e.g., computer programming languages. Examples of natural languages include English and French.

When the user initializes composition of an electronic message at the computing device, the computing device can launch an input method editor. The input method editor can have one or more functions that enable the user to input text of the electronic message. Examples of input method editor functions include spell/grammar checking, specialized virtual keyboards, and speech-to-text conversion.

SUMMARY

A computer-implemented method is presented. The method can include initializing, at a computing device including one or more processors, an input method editor for composing an electronic message. The method can include receiving, at the computing device, an input from a user identifying a recipient for the electronic message. The method can include obtaining, at the computing device, language information corresponding to the recipient, the language information indicating one or more suggested natural languages for composing the electronic message, each suggested natural language having a probability score indicating a likelihood that its suggested natural language is appropriate for communication with the recipient, wherein the language information is obtained from at least one of a memory of the computing device, a remote server, and a search of a network. The method can include selecting, by the computing device, a suggested natural language having a highest probability score to obtain a selected natural language for composing the electronic message. The method can include outputting, at the computing device, a confidence indication indicative of a degree of reliability of the selected natural language, wherein the degree of reliability corresponds to the probability score of the selected natural language. The method can include configuring, at the computing device, the input method editor based on the selected natural language to obtain a configured input method editor. The method can include receiving, at the computing device, another input from the user via the configured input method editor to compose the electronic message to obtain a composed electronic message. The method can also include transmitting, from the computing device, the composed electronic message to another computing device associated with the recipient.

Another computer-implemented method is also presented. The method can include initializing, at a computing device including one or more processors, an input method editor for composing an electronic message. The method can include receiving, at the computing device, an input from a user identifying a recipient for the electronic message. The method can include obtaining, at the computing device, language information corresponding to the recipient, the language information indicating one or more suggested natural languages for composing the electronic message. The method can include selecting, at the computing device, a natural language for composing the electronic message based on the language information to obtain a selected natural language. The method can also include configuring, at the computing device, the input method editor based on the selected natural language.

In some embodiments, selecting the natural language for composing the electronic message includes automatically selecting, by the computing device, the natural language for composing the electronic message based on the language information to obtain the selected natural language.

In other embodiments, selecting the natural language for composing the electronic message includes: prompting, by the computing device, the user for a selection of the one or more suggested natural languages, and receiving, at the computing device, the selection by the user of one of the one or more suggested natural languages to obtain the selected natural language.

In some embodiments, obtaining the language information corresponding to the recipient further includes: searching a network for the language information corresponding to the recipient when the computing device has no language information corresponding to the recipient, and receiving the language information from a server on the network in response to the searching.

In other embodiments, obtaining the language information corresponding to the recipient includes retrieving at least a portion of the language information from a profile of the recipient stored at a memory of the computing device.

In some embodiments, obtaining the language information corresponding to the recipient further includes receiving at least another portion of the language information from another profile of the recipient stored at a server located remotely from the computing device.

In other embodiments, the language information corresponds to a group of one or more users that includes the recipient.

In some embodiments, the language information includes information indicative of a probability score for each suggested natural language, each probability score indicating a likelihood that its corresponding suggested natural language is appropriate for communication with the recipient.

In other embodiments, the language information includes the probability scores for the suggested natural languages.

In some embodiments, the method further includes: storing, at the computing device, the one or more probability scores at a memory of the computing device in response to obtaining the language information, and selectively adjusting, at the computing device, the one or more probability scores based on other electronic communication between the user and the recipient.

In other embodiments, the method further includes calculating, at the computing device, the probability scores for the natural languages based on the language information, wherein the language information includes statistics of past usage by the user of each of the one or more suggested natural languages.

In some embodiments, the statistics of past usage by the user of a specific suggested natural language are on a per document basis or on a per word basis.

In other embodiments, the method further includes outputting, at the computing device, a confidence indication indicative of a degree of reliability of the selected natural language, wherein the degree of reliability corresponds to the probability score corresponding to the selected natural language.

In some embodiments, the input method editor is a speech-to-text input method editor configured to receive speech input and to convert the speech input to text for the electronic message, and the confidence indication is output at the computing device prior to receiving speech input for conversion to text by the speech-to-text input method editor.

In other embodiments, configuring the input method editor based on the selected natural language includes at least one of: (i) configuring a spell checker based on the selected natural language, (ii) configuring a grammar checker based on the selected natural language, (iii) configuring a layout of a virtual keyboard displayed by the computing device based on the selected natural language, (iv) configuring an auto-correction dictionary based on the selected natural language, (v) configuring an acoustic model for speech-to-text based on the selected natural language, (vi) configuring a language model for speech-to-text based on the selected natural language, and (vii) configuring a translation model for language translation from the selected natural language to another natural language that the user can at least one of compose in and understand.

A computing device is also presented. The computing device can include one or more processors and a communication device. The one or more processors can be configured to initialize an input method editor for composing an electronic message. The communication device can be configured to receive an input from a user indicating a recipient for the electronic message. The one or more processors can be configured to obtain language information corresponding to the recipient, the language information indicating one or more suggested natural languages for composing the electronic message. The one or more processors can be configured to select a natural language for composing the electronic message based on the language information to obtain a selected natural language. The one or more processors can also be configured to configure the input method editor based on the selected natural language.

In some embodiments, the one or more processors are configured to automatically select the natural language for composing the electronic message based on the language information to obtain the selected natural language.

In other embodiments, the one or more processors are configured to select the natural language for composing the electronic message by: prompting the user for a selection of the one or more suggested natural languages using the communication device, and receiving the selection by the user of one of the one or more suggested natural languages via the communication device to obtain the selected natural language.

In some embodiments, the one or more processors are configured to obtain the language information corresponding to the recipient by: searching a network for the language information corresponding to the recipient when the computing device has no language information corresponding to the recipient, and receiving the language information from a server on the network in response to the searching.

In other embodiments, the one or more processors are configured to obtain the language information corresponding to the recipient by retrieving at least a portion of the language information from a profile of the recipient stored at a memory of the computing device.

In some embodiments, the one or more processors are configured to obtain the language information corresponding to the recipient by receiving at least another portion of the language information from another profile of the recipient stored at a server located remotely from the computing device.

In other embodiments, the language information corresponds to a group of one or more users that includes the recipient.

In some embodiments, the language information includes information indicative of a probability score for each suggested natural language, each probability score indicating a likelihood that its corresponding suggested natural language is appropriate for communication with the recipient.

In other embodiments, the language information includes the probability scores for the suggested natural languages, and wherein the one or more processors are further configured to: store the one or more probability scores at a memory of the computing device in response to obtaining the language information, and selectively adjust the one or more probability scores based on other electronic communication between the user and the recipient.

In some embodiments, the one or more processors are further configured to calculate the probability scores for the natural languages based on the language information, wherein the language information includes statistics of past usage by the user of each of the one or more suggested natural languages.

In other embodiments, the statistics of past usage by the user of a specific suggested natural language are on a per document basis or on a per word basis.

In some embodiments, the one or more processors are further configured to output, via the communication device, a confidence indication indicative of a degree of reliability of the selected natural language, wherein the degree of reliability corresponds to the probability score corresponding to the selected natural language.

In other embodiments, the input method editor is a speech-to-text input method editor configured to receive speech input and to convert the speech input to text for the electronic message, and the confidence indication is output using the communication device prior to receiving speech input for conversion to text by the speech-to-text input method editor.

In some embodiments, the one or more processors are configured to configure the input method editor based on the selected natural language by at least one of: (i) configuring a spell checker based on the selected natural language, (ii) configuring a grammar checker based on the selected natural language, (iii) configuring a layout of a virtual keyboard displayed by the communication device based on the selected natural language, (iv) configuring an auto-correction dictionary based on the selected natural language, (v) configuring an acoustic model for speech-to-text based on the selected natural language, (vi) configuring a language model for speech-to-text based on the selected natural language, and (vii) configuring a translation model for language translation from the selected natural language to another natural language that the user can at least one of compose in and understand.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

A user may communicate in a specific natural language when communicating with a specific recipient. For example, each recipient may have a corresponding natural language that the user utilizes for his/her electronic messages addressed to that recipient. The input method editor may be configured according to a selected natural language. The user can change the selected natural language for each recipient, but this can be cumbersome and time consuming.

Accordingly, techniques are presented for automatically selecting a natural language for processing input at a computing device. Upon initialization of an input method editor for composing an electronic message, a computing device can obtain language information corresponding to a recipient of the electronic message. The language information can indicate one or more suggested natural languages for composing the electronic message.

Each of these suggested natural languages can have a probability score indicating a likelihood that its corresponding suggested natural language is appropriate for communication with the recipient. Based on the language information, the computing device can select a natural language for composing the electronic message to obtain a selected natural language. The computing device can then configure the input method editor based on the selected natural language.

The language information can be stored locally and/or remotely. In some examples, the language information can be learned from past electronic communication between the user and the recipient. In addition, when no language information exists for the recipient, the computing device can search a network to obtain the language information, e.g., by crawling the recipient's social media profile.

Figure 1:
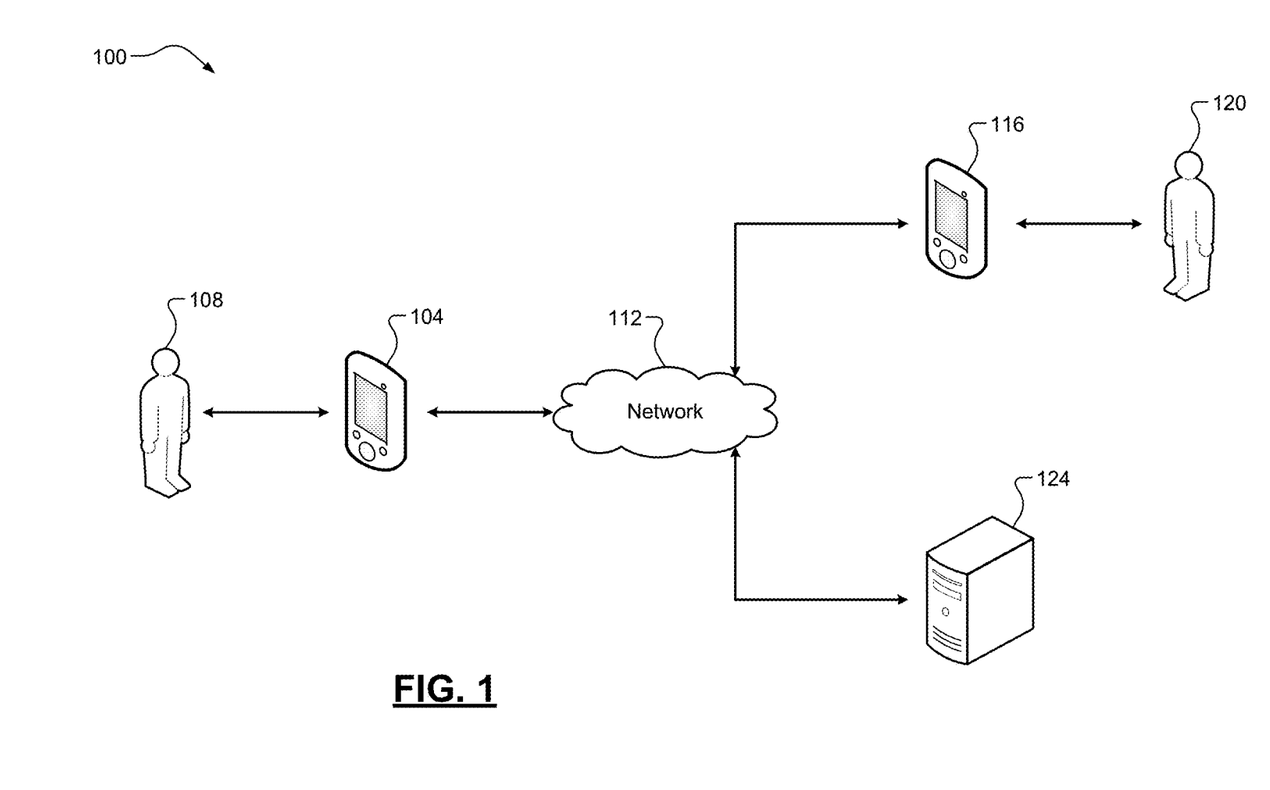
FIG. 1 is a diagram of an example computing system including a computing device and a server according to some implementations of the present disclosure.

Referring now to FIG. 1, an example computing system 100 is illustrated. The computing system 100 can include a first computing device 104 that is operable by a user 108. Examples of the first computing device 104 include computing devices configured to launch and utilize an input method editor (a desktop computer, a laptop computer, a tablet computer, a mobile phone, etc.). Specifically, the user 108 can utilize the input method editor to compose electronic messages at the first computing device 104. These electronic messages can then be sent to other computing devices via a network 112. The first computing device 104, therefore, can also be referred to as a sending computing device 104. The network 112 can be any one or more suitable networks for transmitting data between computing devices (such as a local area network (LAN), a wide area network (WAN), e.g., the Internet, or a combination thereof).

A second computing device 116 can be operable by another user 120. Examples of the second computing device 116 include computing devices configured to receive the electronic messages from the sending computing device 104 via the network 112 (a desktop computer, a laptop computer, a tablet computer, a mobile phone, etc.). The second computing device 116, therefore, can also be referred to as a receiving computing device 116. Similarly, user 120 can also be referred to as a recipient 120. A server 124 can also be connected to the network 112. The server 124 can provide the language information for the recipient 120 to the sending computing device 104 according to some implementations of the present disclosure, which are described in more detail below. Examples of the server 124 include a single server and two or more servers operating in a parallel or distributed architecture.

Figure 2:
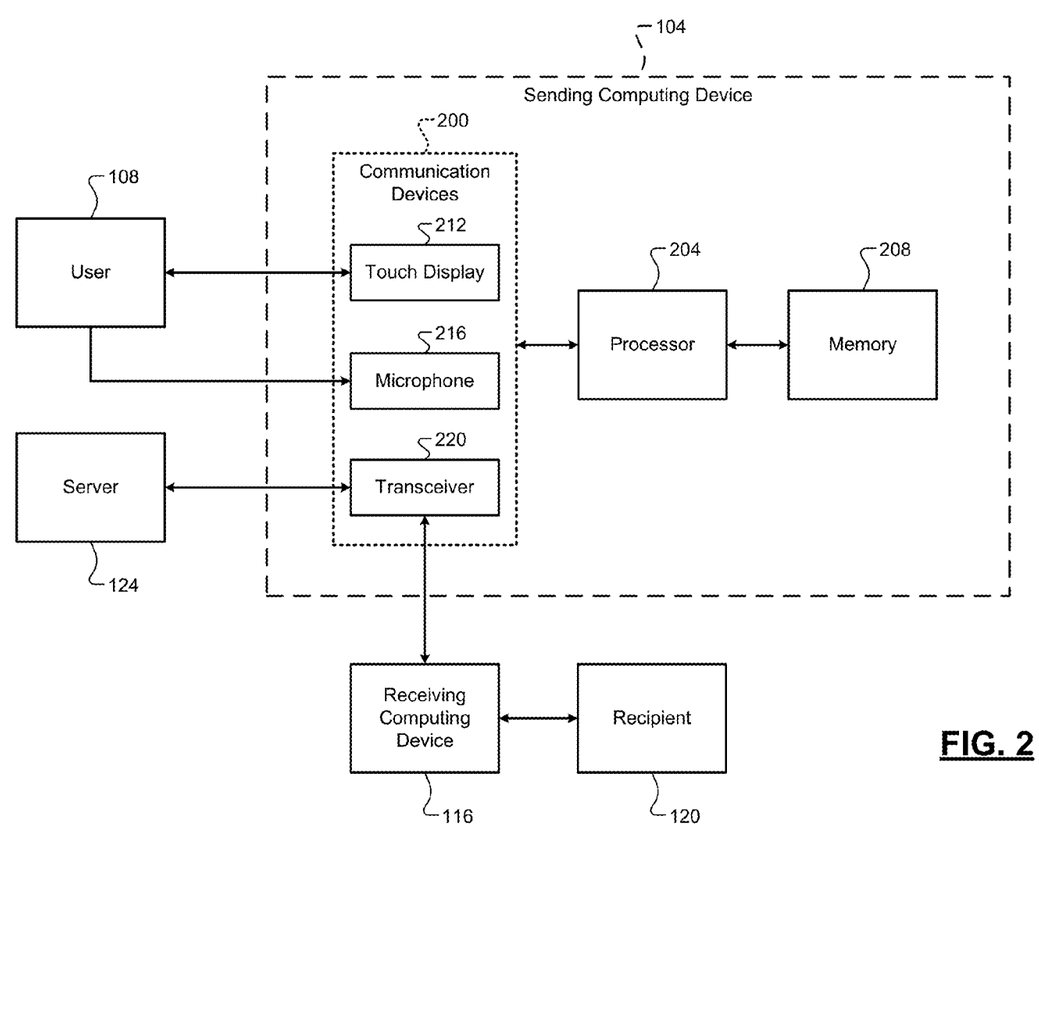
FIG. 2 is a functional block diagram of the computing device of FIG. 1.

Referring now to FIG. 2, a functional block diagram of the example sending computing device 104 is illustrated. The sending computing device 104 can include communication devices 200, a processor 204, and a memory 208. Examples of the processor 204 include both a single processor and two or more processors operating in a parallel or distributed architecture. Examples of the memory 208 include storage mediums (flash, hard disk, etc.) configured to store information, such as the language information for the recipient 120, at the sending computing device 104. In some embodiments, the receiving computing device 116 and/or the server 124 have a same or similar architecture as the sending computing device 104.

Example components of the communication device 200 include components configured for communication with the user 108 and/or other computing devices on the network 112, such as the receiving computing device 116 and the server 124. For example, the communication devices 200 can include a touch display 212 and a microphone 216 for communication with the user 104 and a transceiver 220 configured for communication with the receiving computing device 116 and/or the server 124 via the network 112. Other example components of the communication devices 200 include a speaker, a physical keyboard, and/or other physical buttons.

The processor 204 can initialize an input method editor for composing an electronic message in response to an input by the user 108. For example, this input can be a touch input via the touch display 212, a speech input via the microphone 216, or another suitable input. Additionally, the user 108 can provide another input indicating the recipient 120 for the electronic message. Examples of this input include a touch input, a speech input, or another suitable input such as selecting the recipient 120 from a list of contacts.

After the recipient 120 has been identified, the processor 204 can obtain language information corresponding to the recipient 120. The term "language information" can refer to any data indicative of one or more natural languages that may be utilized or comprehended by the recipient 120. The one or more natural languages indicated by the language information can also be referred to as one or more suggested natural languages because the user 108 may have configured the sending computing device 108 to use a particular natural language, e.g., a default natural language, which is different than the one or more suggested natural languages.

According to certain embodiments, language information examples include past electronic communication between the user 108 and the recipient 120 (electronic messages, voice/ video communications, etc.) and preferred natural languages selected by the user 108 and/or by the recipient 120. According to one embodiment, the language information is associated and stored with a contact profile for the recipient 120. This contact profile could be stored at the sending computing device 104, at the server 124, or a combination thereof. The processor 204 can retrieve at least a portion of the language information from the contact profile for the recipient 120, which can be stored at the memory 208, and/or the processor 204 can retrieve at least a portion of the language information from the server 124 using the communication devices 200.

In some cases, there may be no stored language information corresponding to the recipient 120. For example, the recipient 120 may be a "new recipient" or "new contact," which the user 108 may not have communicated with before. In such cases, the sending computing device 104 can automatically use its default natural language to configure the input method editor. In some implementations, the sending computing device 104 can attempt to search the network 112 for the language information corresponding to the recipient 120 when the sending computing device 104 cannot obtain language information corresponding to the recipient 120 from its memory 208 or from the server 124. If language information for the recipient 120 is found as a result of the search, the language information can then be obtained by the sending computing device 104 via the network 112, e.g., from another server. If no language information for the recipient 120 is found via the search, the default natural language can be used.

In some implementations, the language information can correspond to a group of users that includes the recipient 120. The user 108 may or may not also be part of the group of users. Each user in the group of users can have the same language information associated with him/her. Examples of groups of users family-based groups, such as "Cousins," or language-specific groups, such as "French friends." For example, the recipient 120 could be a family member of a German speaking family, or the recipient 120 could be one of a group of French speaking acquaintances. In some implementations, the group of users could be associated with a social network or could be manually created by the user 108 or another user. For example only, in cases where a natural language associated with the group of users containing the recipient 120 does not correspond to a suggested natural language for the recipient 120, the natural language associated with the group of users could override the suggested natural language for the recipient 120.

The language information can include a probability score corresponding to each suggested natural language. Each probability score can indicate a likelihood that its corresponding suggested natural language is appropriate for communication with the recipient 120. These probability scores can be calculated, e.g., by the processor 204 or other computing device, using any suitable natural language scoring algorithm. As previously mentioned, the probability scores can be calculated using past electronic communication between the user 108 and the recipient 120. Additionally or alternatively, the probability scores can be calculated based on other suitable user information (language preferences from other applications, domain name servers (DNS) information from web browsing activity, etc.), or based on other suitable recipient information provided the recipient 120 has consented or made his/her information publicly available (information specific to only the recipient 120, information identified via a search of the network 112, etc.).

In some implementations, the probability scores can be calculated based on a past usage of the natural languages. This past usage could be on a per document basis, e.g., per e-mail, on a per word basis, or on another suitable usage basis. For example only, when the user 108 composes 80 out of 100 e-mails in French, the probability score for French could be 80%. The probability scores can be stored at the memory 208 of the sending computing device 104 in response to obtaining the language information. In some implementations, the probability scores can be selectively adjusted, e.g., by the processor 204, based on other, e.g., additional, electronic communication between the user 108 and the recipient 120 or based on other suitable modifiers, such as the preferences of the recipient 120 overriding the preferences or past usage by the user 108.

The processor 204 can select one of the suggested natural languages to obtain a selected natural language. For example, the selected natural language may be one of the one or more suggested natural languages having a highest probability score. Alternatively, the selected natural language could be the default natural language, which may or may not be one of the suggested natural languages. For example, if none of the one or more suggested natural languages has a probability score greater than a predetermined threshold indicative of an acceptable likelihood, the processor 204 can select the default natural language.

In some implementations, the processor 204 can output, e.g., via the communication devices 200, a confidence indication indicative of a degree of reliability of the selected natural language. The degree of reliability corresponds to the probability score corresponding to the selected natural language. For example, the probability score could be a percentage and the degree of reliability could be the same percentage. Alternatively, for example, the degree of reliability could be another suitable indicator for the probability score, such as a color (green=confident, yellow=somewhat confident, and red=not confident). When the input method editor is a speech-to-text input method editor, the confidence indication may be output at the sending computing device 104, e.g., via the communication devices 200, prior to receiving speech input for conversion to text by the speech-to-text input method editor.

In some implementations, the processor 204 can provide two or more of the suggested languages as options for the user 108. For example, these two or more natural languages could be presented to the user 108 at the touch display 212. The user 108 can then select one of these options to obtain the selected natural language. These two or more natural languages presented to the user 108 could be the two or more natural languages having the highest probability scores. Alternatively, the two or more natural languages presented to the user 108 could include a highest scored natural language and a default natural language. The processor 204 can also provide the user 108 with the confidence indication for each of the two or more presented natural languages, e.g., green/yellow/red.

The processor 204 can then configure the input method editor based on the selected natural language. For example, configuring the input method editor may include optimizing the input method editor for operation with the selected natural language. In one embodiment, when the user 108 is incapable of composing in the selected natural language, the processor 204 can invoke (or suggest invoking) a translation application for the user 108. Examples of various input method editors and the corresponding configuration include (i) configuring a spell checker based on the selected natural language, (ii) configuring a grammar checker based on the selected natural language, (iii) configuring a layout of a virtual keyboard displayed by the computing device based on the selected natural language, (iv) configuring an auto-correction dictionary based on the selected natural language, (v) configuring an acoustic model for speech-to-text based on the selected natural language, (vi) configuring a language model for speech-to-text based on the selected natural language, and (vii) configuring a translation model for language translation from the selected natural language to another language that the user 108 can compose in and/or understand. It should be appreciated that other suitable configuration of the input method editor can be performed.

The sending computing device 104 can then receive input via the configured input method editor for composing the electronic message. After the electronic message is composed, the electronic message can be sent, e.g., via the communication devices 200 and the network 112, to the recipient 120 at the receiving computing device 116.

Figure 3:
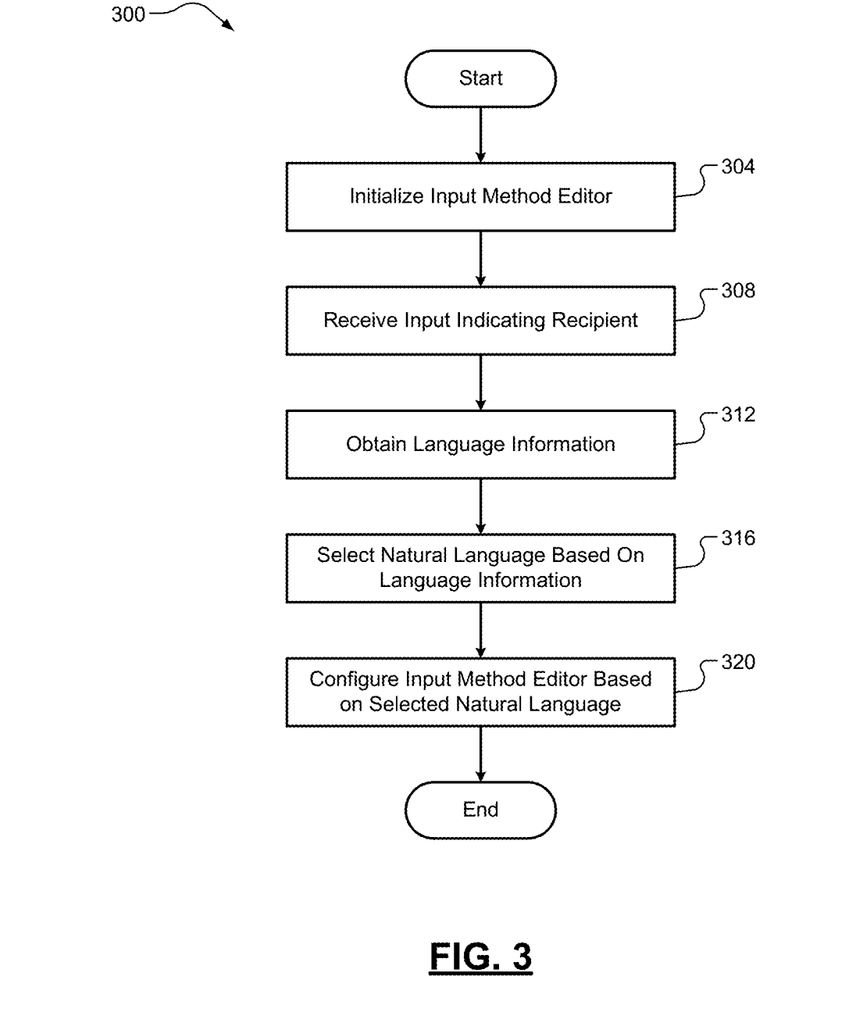
FIG. 3 is a flow diagram of an example method of automatically selecting a natural language for processing input at a computing device according to some implementations of the present disclosure.

Referring now to FIG. 3, an example method 300 for automatically selecting a natural language for processing input at the sending computing device 104 is illustrated. At 304, the sending computing device 104 can initialize an input method editor for composing an electronic message. At 308, the sending computing device 104 can receive an input from the user 108 identifying the recipient 120 for the electronic message. At 312, the sending computing device 104 can obtain language information corresponding to the recipient 120, the language information indicating one or more suggested natural languages for composing the electronic message. At 316, the sending computing device 104 can select a natural language for composing the electronic message based on the language information to obtain a selected natural language. At 320, the sending computing device 104 can configure the input method editor based on the selected natural language. The method 300 can then end or return to 304 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
   initializing, at a computing device including one or more processors, an input method editor for composing an electronic message;
   receiving, at the computing device, an input from a user identifying a recipient for the electronic message;
   obtaining, at the computing device, language information corresponding to the recipient, the language information indicating one or more suggested natural languages for composing the electronic message, each suggested natural language having a probability score indicating a likelihood that its suggested natural language is appropriate for communication with the recipient, wherein the language information is obtained from at least one of a memory of the computing device, a remote server, and a search of a network;
   selecting, by the computing device, a suggested natural language having a highest probability score to obtain a selected natural language for composing the electronic message;
   outputting, at the computing device, a confidence indication indicative of a degree of reliability of the selected natural language, wherein the degree of reliability corresponds to the probability score of the selected natural language;
   configuring, at the computing device, the input method editor based on the selected natural language to obtain a configured input method editor;
   receiving, at the computing device, a touch or speech input from the user;
   generating, at the computing device, the electronic message using the configured input method editor and the touch or speech input; and
   transmitting, from the computing device, the generated electronic message to another computing device associated with the recipient, wherein receipt of the generated electronic message causes the other computing device to render the generated electronic message and display the rendering.

2. A computer-implemented method, comprising:
   initializing, at a computing device including one or more processors, an input method editor for composing an electronic message;
   receiving, at the computing device, an input from a user identifying a recipient for the electronic message;
   obtaining, at the computing device, language information corresponding to the recipient, the language information indicating one or more suggested natural languages for composing the electronic message;
   selecting, at the computing device, a natural language for composing the electronic message based on the language information to obtain a selected natural language;
   configuring, at the computing device, the input method editor based on the selected natural language;
   receiving, at the computing device, a touch or speech input from the user;
   generating, at the computing device, the electronic message using the configured input method editor and the touch or speech input; and
   transmitting, from the computing device, the generated electronic message to another computing device associated with the recipient, wherein receipt of the generated electronic message causes the other computing device to render the generated electronic message and display the rendering.

3. The computer-implemented method of claim 2, wherein selecting the natural language for composing the electronic message includes automatically selecting, by the computing device, the natural language for composing the electronic message based on the language information to obtain the selected natural language.

4. The computer-implemented method of claim 2, wherein selecting the natural language for composing the electronic message includes:
   prompting, by the computing device, the user for a selection of the one or more suggested natural languages; and
   receiving, at the computing device, the selection by the user of one of the one or more suggested natural languages to obtain the selected natural language.

5. The computer-implemented method of claim 2, wherein obtaining the language information corresponding to the recipient further includes:

searching a network for the language information corresponding to the recipient when the computing device has no language information corresponding to the recipient; and receiving the language information from a server on the network in response to the searching.

6. The computer-implemented method of claim 2, wherein obtaining the language information corresponding to the recipient includes retrieving at least a portion of the language information from a profile of the recipient stored at a memory of the computing device.

7. The computer-implemented method of claim 6, wherein obtaining the language information corresponding to the recipient further includes receiving at least another portion of the language information from another profile of the recipient stored at a server located remotely from the computing device.

8. The computer-implemented method of claim 2, wherein the language information corresponds to a group of one or more users that includes the recipient.

9. The computer-implemented method of claim 2, wherein the language information includes information indicative of a probability score for each suggested natural language, each probability score indicating a likelihood that its corresponding suggested natural language is appropriate for communication with the recipient.

10. The computer-implemented method of claim 9, wherein the language information includes the probability scores for the suggested natural languages.

11. The computer-implemented method of claim 10, further comprising:
    storing, at the computing device, the one or more probability scores at a memory of the computing device in response to obtaining the language information; and
    selectively adjusting, at the computing device, the one or more probability scores based on other electronic communication between the user and the recipient.

12. The computer-implemented method of claim 9, further comprising calculating, at the computing device, the probability scores for the natural languages based on the language information, wherein the language information includes statistics of past usage by the user of each of the one or more suggested natural languages.

13. The computer-implemented method of claim 12, wherein the statistics of past usage by the user of a specific suggested natural language are on a per document basis or on a per word basis.

14. The computer-implemented method of claim 9, further comprising outputting, at the computing device, a confidence indication indicative of a degree of reliability of the selected natural language, wherein the degree of reliability corresponds to the probability score corresponding to the selected natural language.

15. The computer-implemented method of claim 14, wherein the input method editor is a speech-to-text input method editor configured to receive speech input and to convert the speech input to text for the electronic message, and wherein the confidence indication is output at the computing device prior to receiving speech input for conversion to text by the speech-to-text input method editor.

16. The computer-implemented method of claim 2, wherein configuring the input method editor based on the selected natural language includes at least one of:
    (i) configuring a spell checker based on the selected natural language;
    (ii) configuring a grammar checker based on the selected natural language;
    (iii) configuring a layout of a virtual keyboard displayed by the computing device based on the selected natural language;
    (iv) configuring an auto-correction dictionary based on the selected natural language;
    (v) configuring an acoustic model for speech-to-text based on the selected natural language;
    (vi) configuring a language model for speech-to-text based on the selected natural language; and
    (vii) configuring a translation model for language translation from the selected natural language to another natural language that the user can at least one of compose in and understand.

17. A computing device, comprising:
    one or more processors configured to initialize an input method editor for composing an electronic message; and
    a communication device configured to receive an input from a user indicating a recipient for the electronic message,
    wherein the one or more processors are further configured to:
        obtain language information corresponding to the recipient, the language information indicating one or more suggested natural languages for composing the electronic message,
        select a natural language for composing the electronic message based on the language information to obtain a selected natural language,
        configure the input method editor based on the selected natural language,
        receive a touch or speech input from the user, and
        generate the electronic message using the configured input method editor and the touch or speech input,
    wherein the communication device is further configured to transmit the generated electronic message to another computing device associated with the recipient, and
    wherein receipt of the generated electronic message causes the other computing device to render the generated electronic message and display the rendering.

18. The computing device of claim 17, wherein the one or more processors are configured to automatically select the natural language for composing the electronic message based on the language information to obtain the selected natural language.

19. The computing device of claim 17, wherein the one or more processors are configured to select the natural language for composing the electronic message by:
    prompting the user for a selection of the one or more suggested natural languages using the communication device; and
    receiving the selection by the user of one of the one or more suggested natural languages via the communication device to obtain the selected natural language.

20. The computing device of claim 17, wherein the one or more processors are configured to obtain the language information corresponding to the recipient by:
    searching a network for the language information corresponding to the recipient when the computing device has no language information corresponding to the recipient; and
    receiving the language information from a server on the network in response to the searching.

21. The computing device of claim 17, wherein the one or more processors are configured to obtain the language information corresponding to the recipient by retrieving at least a portion of the language information from a profile of the recipient stored at a memory of the computing device.

22. The computing device of claim 21, wherein the one or more processors are configured to obtain the language information corresponding to the recipient by receiving at least another portion of the language information from another profile of the recipient stored at a server located remotely from the computing device.

23. The computing device of claim 17, wherein the language information corresponds to a group of one or more users that includes the recipient.

24. The computing device of claim 17, wherein the language information includes information indicative of a probability score for each suggested natural language, each probability score indicating a likelihood that its corresponding suggested natural language is appropriate for communication with the recipient.

25. The computing device of claim 24, wherein the language information includes the probability scores for the suggested natural languages, and wherein the one or more processors are further configured to:
store the one or more probability scores at a memory of the computing device in response to obtaining the language information; and
selectively adjust the one or more probability scores based on other electronic communication between the user and the recipient.

26. The computing device of claim 24, wherein the one or more processors are further configured to calculate the probability scores for the natural languages based on the language information, wherein the language information includes statistics of past usage by the user of each of the one or more suggested natural languages.

27. The computing device of claim 26, wherein the statistics of past usage by the user of a specific suggested natural language are on a per document basis or on a per word basis.

28. The computing device of claim 24, wherein the one or more processors are further configured to output, via the communication device, a confidence indication indicative of a degree of reliability of the selected natural language, wherein the degree of reliability corresponds to the probability score corresponding to the selected natural language.

29. The computing device of claim 28, wherein the input method editor is a speech-to-text input method editor configured to receive speech input and to convert the speech input to text for the electronic message, and wherein the confidence indication is output using the communication device prior to receiving speech input for conversion to text by the speech-to-text input method editor.

30. The computing device of claim 17, wherein the one or more processors are configured to configure the input method editor based on the selected natural language by at least one of:
(i) configuring a spell checker based on the selected natural language;
(ii) configuring a grammar checker based on the selected natural language;
(iii) configuring a layout of a virtual keyboard displayed by the communication device based on the selected natural language;
(iv) configuring an auto-correction dictionary based on the selected natural language;
(v) configuring an acoustic model for speech-to-text based on the selected natural language;
(vi) configuring a language model for speech-to-text based on the selected natural language; and
(vii) configuring a translation model for language translation from the selected natural language to another natural language that the user can at least one of compose in and understand.

* * * * *